May 18, 1926.
J. W. SHUMATE
MOUSE TRAP
Filed April 7, 1924
1,585,047
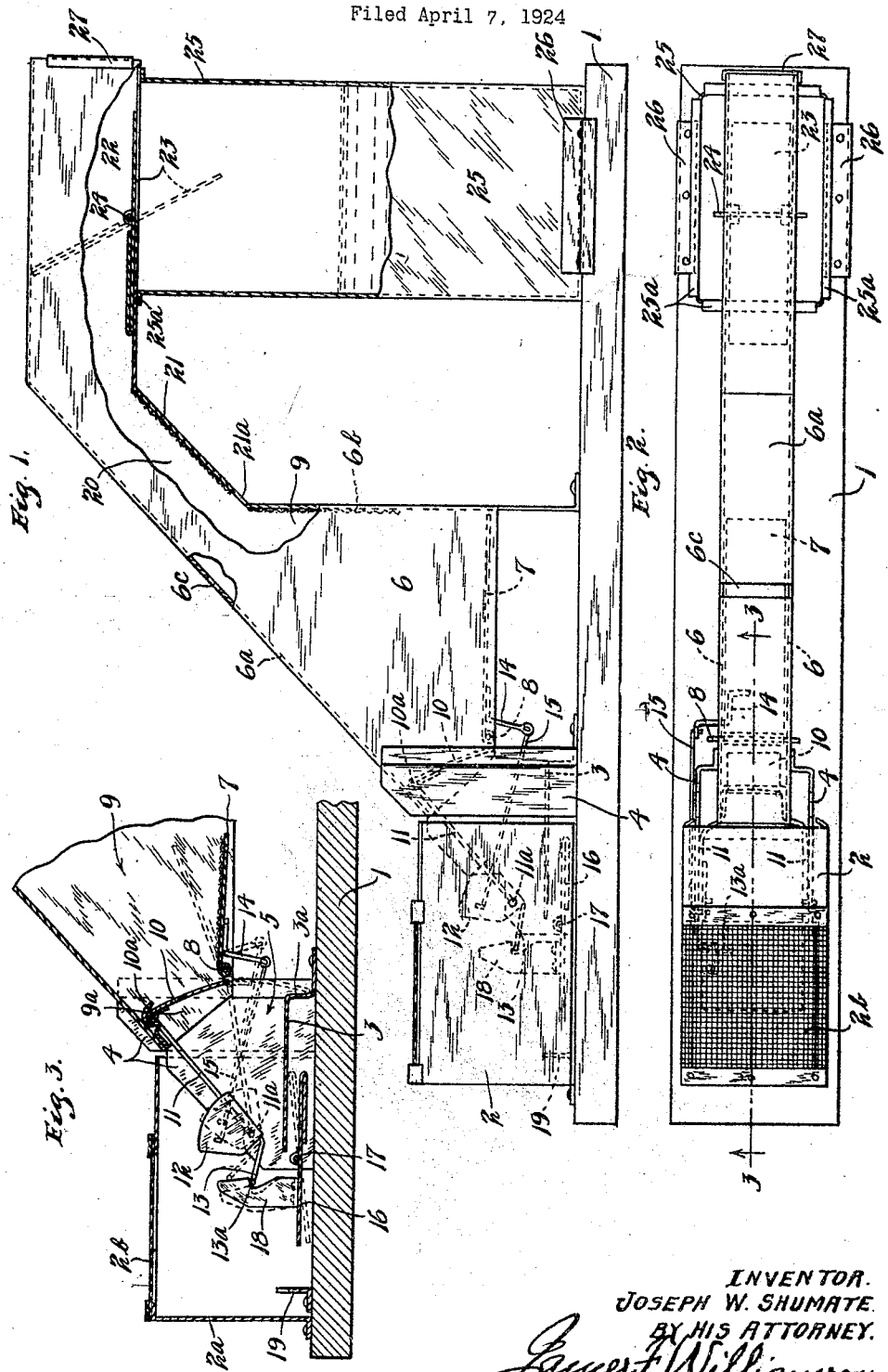
INVENTOR.
JOSEPH W. SHUMATE.
BY HIS ATTORNEY.
James F. Williamson Patented May 18, 1926.

1,585,047

UNITED STATES PATENT OFFICE.

JOSEPH W. SHUMATE, OF MINNEAPOLIS, MINNESOTA.

MOUSETRAP.

Application filed April 7, 1924. Serial No. 704,634.

This invention relates to an animal trap. While the trap may be made so as to be adapted for trapping various animals, it particularly is designed as a rat or mouse trap.

It is an object of this invention to provide a simple and efficient trap which will operate with great certainty to trap the animal and to deposit the animal in a receptacle, preferably containing liquid and which trap will be reset by the animal after the same is trapped.

It is a further object of the invention to provide such a trap having a passageway with an entrance opening for the animal and a door adapted to be dropped by animal operated tripping means to close said entrance opening, said door, in dropping, opening the entrance to another passageway through which the animal then passes.

It is still another object of the invention to provide a passageway having an entrance opening and leading forwardly from said opening, which passageway contains the bait holding means, together with a second passageway having an entrance opening disposed above said first mentioned opening and leading rearwardly therefrom, a door being provided adapted alternately to close and open said entrance openings, there being operative means in said passageways for actuating said door.

It is a still further object of the invention to provide a trap, as above set forth, in which said second mentioned passageway has a substantially vertical rear wall, the upper portion of which is roughened, and from the top of said passageway a third passageway leads having a roughened floor through which the animal is adapted to climb.

These and other objects and advantages of the invention will be fully set forth in the following description made in connection with the accompanying drawings in which like reference characters refer to the same parts throughout the different views, and in which, Fig. 1 is a view for the most part, in side elevation of the trap, certain portions being broken away and other portions shown in vertical section;

Fig. 2 is a top plan view of the trap; and

Fig. 3 is a vertical section taken on the line 3—3 of Fig. 2, as indicated by the arrows.

Referring to the drawings, the device comprises a base member 1 illustrated as in the form of an elongated rectangular board or block. At one end, which will be referred to as the forward end, of the base 1, is secured a rectangular casing 2 having a closed front wall 2ª and closed side walls, but which is provided for a part or all of its top with a perforated or screen portion 2ᵇ formed as a sliding lid. The rear portion of the casing 2 is open. A rigid floor member 3 is secured to the base 1, which floor member is offset at one end to form a shoulder 3ª extending substantially vertically the forward and free end of the member 3 thus being disposed at some distance above the base 1. Spaced side plates 4 are secured to the base 1 and have their forward ends of tapered or trapezoidal shape with downwardly inclined top edges and projecting into the open end of the casing 2 at each side of the floor members 3. These plates, together with the casing 2, thus form a passageway, which passageway has an entrance opening 5 at its rear end. The side plates 4 have their rear ends offset and secured to the side walls 6 of a passageway which leads rearwardly from the plates 4 and has the upwardly inclined top wall 6ª and the substantially vertical rear wall 6ᵇ, which rear wall is continued down to the base 1 and bent rearwardly to receive a pair of fastening screws securing the same to said base. A pivoted plate 7 forms the bottom of the last mentioned passageway, which plate is pivoted at its forward end to a horizontal pivot 8 secured in the side walls 6. Said last mentioned passageway, which will be designated 9, thus has an entrance opening 9ª at its forward end and extends rearwardly from said opening. A door 10 is provided in the form of a plate, which door has rigidly secured thereto comparatively long arms 11 which are offset outwardly adjacent said door and extend forwardly along the inner sides of the plate members 4, being out-turned and pivoted in said plate members at 11ª. The plate 10 is curved slightly about the pivotal point 11ª and is adapted to swing about an axis passing horizontally through said point so that it may be disposed either in the upper normal positon shown in full lines in Fig. 3 or it may drop down by gravity to the position shown in dotted lines in Fig. 3. A plate 10ª is secured adjacent the lower end of the top wall 6ª and has a free edge extending down over the upper end of the door 10 when the same is in its raised position. It will be seen that said door 10 is in its upper position, closes the entrance opening 9ª and when it is in its lower position, closes the entrance opening 5. One of the arms 11 has a lug 12 rigidly secured thereto illustrated as in the form of a segmental plate and said arm has a catch member 13 extending forwardly therefrom, the outer end of which is turned inwardly substantially at a right angle, as shown at 13ª in Fig. 2. The pivoted floor member 7 has an arm 14 secured rigidly to its underside which projects through one of the walls 6 and has a downturned end formed as an eyelet and adapted pivotally to receive one bent end of a link 15, which link extends along the side of one of the plates 4 and has its other end bent and pivotally connected to the lug 12, said link passing inside of the side wall of casing 2. A plate 16 is pivoted on a pin 17 supported in the side plates 4 and extending horizontally substantially in line with and slightly below the free edge of the floor member 3. One end of the plate 16 projects under the floor member 3 and the other end thereof projects forwardly from the free edge of said floor member. The latter end of the member 16 carries at one side an upstanding latch member 18 having a notch cut therein in which the end 13ª of the arms 13 is adapted to engage, as shown in Figs. 1 and 3. It will be seen that plate 16 is adapted to oscillate about its pivot 17, as indicated by the dotted lines in Fig. 3. A toothed plate 19 extends across the front portion of casing 2, being secured to the base 1 and forms a bait holding means.

The side walls 6 and the top walls 6ª are continued upwardly from the upper rear end of the passage 9 to form a narrow rectangular passageway 20 having a roughened bottom wall 21 which may be provided with corrugations or have a section of screen superposed thereon, as illustrated. The upper portion of the rear wall 6ᵇ is also roughened in any suitable manner as by having a section of screen secured thereto, as shown in Fig. 1. The passageway 20 communicates at its upper end with a horizontal passageway 22 having a flat top wall and vertical side walls and this passageway is of slightly greater height than the passageway 20. A plate 23 is pivoted to a horizontal pivot 24 secured in the side walls of passage 22, which plate is adapted normally to be disposed in horizontal position, as shown in full lines in Fig. 1, but which is arranged to oscillate to the position shown by dotted lines in Fig. 1. The plate 23 forms a swinging bottom of the passageway 22 and a receptacle 25 is disposed underneath its bottom. While the receptacle 25 may be of any suitable shape, in the embodiment of this invention illustrated, the same is shown as of rectangular shape having a flange 25ª about its upper edge adapted to slide under the edges of the bottom wall of the passage 22. The lower portion of the tank is received between flanged plates 26 secured at the edges of the base member 1 and adapted frictionally to hold the receptacle 25 in position. It may be noted that the wall 6ª has an opening or slot 6ᶜ therein somewhat forward of the rear wall 6ᵇ and the bottom wall 21 has a similar slot 21ª therein adjacent the wall 6ᵇ. The rear portion of the passage 22 is closed by a plate 27, this plate being shorter than the height of said passage so that cracks or slots are left at the top and bottom thereof.

In operation, the bait, such as a piece of bread or cheese will be placed on the member 19 and flour or similar substance will preferably be strewn on the floor piece 3 and the base member 1. Assuming that a mouse is to be caught, the same will mount the base 1 and will enter through the opening 5 on the floor 3. The door 10 at this time is then in raised position, as shown in Fig. 3 and the catch 13ª is engaged by the latch 18. When the mouse advances toward the bait and steps onto the plate 16, the same swings downwardly as shown in dotted lines in Fig. 3 so that latch 18 is disengaged from the member 13. The door 10 is now free to drop by gravity and drops down to the position shown in dotted lines in Fig. 3 closing the opening 5 and opening the entrance opening 9ª. The mouse, hearing the noise behind him as the door 10 strikes the lower part of the floor 3, immediately turns and attempts to hurriedly leave by the same entrance through which he entered. This, however, is closed by the door 10 and the mouse mistakingly jumps through the opening 9ª into the passage 9. As the mouse thus comes onto the floor plate 7 the same swings downwardly under his weight and the arm 14, through the link 15 and the lug 12, swings the door 10 up to its normal position and the catch 13 is again engaged with the latch 18. The entrance opening 9ª is now closed and the mouse can not pass back into the passageway into which he first entered. Seeing the light above through the slot or opening 6ᶜ, the mouse climbs upwardly standing on its hind feet on the floor 7. The roughened part of the rear wall 6ᵇ enables the mouse to climb up and it passes on upwardly through the passage 20 into the passage 22. Seeing the light ahead at the top and bottom of the plate 27 the mouse advance towards these openings and steps on the outer end of the swinging plate 23 from which it is precipitated into the receptacle 25. Receptacle 25 is maintained about half full of water or other suitable liquid, which, preferably, is iced. The mouse being plunged into the cold water in the receptacle 25 can not escape and soon expires. It will be noted that as soon as the mouse steps onto the plate 7, the trap is re-set so that it is in readiness for another mouse to enter and be trapped. It will be noted that the door 10, when it swings downwardly, extends along the vertical portion or shoulder 3ª of the floor piece 3. The mouse, trapped by the descent of the door, can thus not see a crack of light at the bottom of the door 10 and he can not get his claws under the bottom of the door 10 to raise the same. Likewise, when the door 10 swings upwardly, the mouse can not see the light crack above the top of the door on account of the same being behind the plate 10ª and the mouse can not get its claws over the top of the door 10 to pull the door downwardly. The mouse always tries to go back the way he entered and it has been observed that in the present structure, the mouse will turn back after jumping into the passage 9 and try for some time to open the door 10. The mouse, however, can not trip the door and can not pull the same downwardly, as above stated, on account of the plate 10ª. The mouse then, as above described, sees the light in the opening 6ᶜ and 21ª and passes up through the inclined passage 20. Trouble has been experienced with traps of the prior art, such as shown in applicant's prior Patent, 1,354,700, granted October 5, 1920, on account of the fact that the mice will not advance through the trap and climb up through the vertical passage into the trap receptacle. This trouble has been overcome in the present structure which has the inclined passage 20. Although hundreds of mice have been caught with the trap of the present structure, in not one instance has the mouse remained in the passage 9. The tank 25 can readily be removed to dispose of the mice which have been caught. The bait is conveniently placed in the trap by removal of the sliding lid 2ᵇ.

From the above description it is seen that applicant has provided a comparatively simple and a very efficient mouse trap. The same can be easily and quite inexpensively manufactured from sheet metal and non-corrosive metal, preferably, is used. The mechanism of the trap is quite simple and requires no attention for maintaining the same in operative condition. The device has been amply demonstrated in actual practice and found to be very successful and efficient. A large number of mice have been caught in the trap in one night.

It will, of course, be understood, that various changes may be made in the form, details, arrangement and proportions of the parts without departing from the scope of applicant's invention, which, generally stated, consists in a device capable of carrying out the objects above set forth, such as shown and described and defined in the appended claims.

What is claimed is:

1. An animal trap having in combination, a casing having therin an unobstructed chamber with a normally open entrance opening at one end and a normally closed exit opening above said entrance opening, a door adapted to drop by gravity normally latched in elevated position to close said exit opening but adapted to close said entrance opening and open said exit opening upon being released, and trip means operated by the animal for releasing said door and permitting the same to drop.

2. An animal trap comprising a passageway having an entrance opening at one end and leading forwardly from said opening, a trip plate forming the floor of said passageway, a second passageway having an entrance opening at its front end above and adjacent said first mentioned opening and leading rearwardly therefrom, a door moving in a substantially vertical plane adapted normally to close the second mentioned entrance opening but adapted to move down to close the first mentioned entrance opening and open the second mentioned opening, and a latching means for connecting said trip plate and door releasable by said trip plate when the animal treads on the latter.

3. An animal trap comprising a passageway having an entrance opening at one end and leading frowardly from said opening, a second passageway having an entrance opening at its front end above and adjacent said first mentioned opening and leading rearwardly therefrom, a door moving in a substantially vertical plane adapted normally to close the second mentioned entrance opening but adapted to move down to close the first mentioned entrance opening and open the second mentioned opening, a trip plate in said first mentioned passageway adapted to permit said door to drop, a swinging plate in said second mentioned passage adapted to raise said door to normal position, said plates being arranged to be tread upon by the animal.

4. An animal trap having in combination, a casing having therein, a substantially unobstructed chamber having an entrance opening which is open to the exterior of the trap at one end adjacent its bottom and having an exit opening at said end above said entrance opening and leading to a passageway, a swinging door normally in elevated position to close said exit opening but adapted to drop by gravity to close said entrance opening, a trip means in the bottom of said chamber, a latch normally holding said door in elevated position, said latch being connected to said trip means whereby the weight of the animal on said trip means will trip said latch and permit said door to drop.

5. The structure set forth in claim 2 and a plate extending downwardly over the upper edge of said door when in raised position whereby the animal cannot get at the upper edge of the door with its claws to move the same downwardly.

6. An animal trap having in combination, a casing having an entrance opening at one end, said casing having a floor adjacent said entrance opening, said floor having a vertical ledge at its end adjacent said opening, and a surface extending horizontally from the bottom of said ledge forming a substantially right angle corner, a door mounted for swinging movement in said casing to close and open said entrance opening, said door having a horizontal edge movable into said right angle corner and substantially in contact with said vertical and horizontal surfaces whereby no crack is left and a trapped animal cannot get under said door to raise the same with its claws.

7. An animal trap comprising a passageway having an entrance opening at one end thereof, a second passageway extending rearwardly from said first mentioned passageway and having an entrance opening thereinto, a movable door, a latch holding said door in position closing said second passageway, means in said first mentioned passageway adapted to be operated by the animal to release said latch and cause said door to close the first mentioned entrance opening and open the second mentioned entrance opening whereby the animal, when having moved into the first passageway, will be caused to return by the noise of said door and will pass into the second passageway.

8. An animal trap comprising a passageway having an entrance opening at one end and extending forwardly therefrom, a vertically movable door adjacent said entrance opening, elongated arms secured to said door extending forwardly therefrom and pivoted at the side of said passageway, one of said arms having a catch projecting forwardly therefrom, a latch adapted to engage said catch to hold said door in raised position above said entrance opening, and a pivoted platform at the forward end of said passageway carrying said latch whereby when the animal steps on said pivoted platform, the said door will be dropped and close said entrance opening.

9. The structure set forth in claim 8, a second passageway leading rearwardly from above said entrance opening, a pivoted plate forming the bottom of said second passageway, an arm secured to said pivoted plate, a lug projecting upwardly from one of said first mentioned arms secured to said door, and a link connecting said arm and said lug whereby when said pivoted plate is depressed after said door is dropped, said link will be moved to swing said lug and raise said door again to open said entrance opening and engage said catch and latch.

10. The structure set forth in claim 8, said passageway having a rigid floor therein extending substantially to the pivot of said pivoted platform, one end of said platform being disposed beneath said rigid floor whereby the animal will step off of said floor onto the downwardly movable end of said platform.

11. An animal trap having in combination, a casing comprising substantially vertically spaced side walls, and having a passageway with an entrance opening at its rear end, leading forwardly from said opening, a trip plate in the bottom of said passageway, a second passageway leading from said first mentioned passageway and having an entrance opening communicating with the latter above said first mentioned entrance opening, a door having long arms pivoted at their inner ends in said vertical walls whereby said door swings in a substantially vertical plane, a latch holding said door in elevated position to normally close said second mentioned opening, said door being adapted, upon being released, to drop by gravity to close said first mentioned opening, said latch being connected to said strip plate whereby the weight of said anvil on said plate will release said latch and permit said door to drop.

12. An animal trap having in combination, a passageway with a bait holding means at its front end and an entrance opening at its rear end, a door adapted to drop to close said entrance opening, a trip means adjacent the front of said passageway adapted to be operated by said animal to permit said door to drop, a second passageway having an entrance opening above said entrance opening and leading rearwardly therefrom, a swinging floor in said second passageway connected to said door and adapted to be depressed by the animal to raise said door, said door being adapted when raised to close the entrance opening to said second passageway.

13. An animal trap having a passageway with an entrance opening at its rear end, a bait holding means at the front end thereof, a rigid floor in said passageway, a pivoted plate having one end projecting from the forward end of said floor, a latch carried by said plate, a door adjacent said entrance opening, comparatively long arms rigidly secured to and extending forwardly from said door and pivoted to the sides of said passageway, an extension catch carried by one of said arms adapted to engage said latch to hold said door raised, a lug projecting upwardly from one of said arms, a second passageway, a pivoted downwardly swinging bottom plate therefor, an arm projecting downwardly from said plate, and a link connecting said latter arms in said lug whereby downward movement of said latter plate will swing said door upwardly and engage said catch and latch.

14. An animal trap comprising a substantially unobstructed chamber having an entrance opening at one end, a passageway from said end of said chamber and having an entrance opening communicating therewith substantially above said first mentioned entrance opening, said latter passageway being closed, except at the end thereof, opposite said chamber, which end is open and adapted to admit light, a swinging door normally in elevated position to close said second mentioned entrance opening, releasable means holding said door in elevated position, a trip means in the bottom of said chamber adapted to be operated by the weight of the animal thereon for releasing said releasable means to permit said door to drop by gravity and close said first mentioned entrance opening, whereby the animal seeing the light at the end of said passageway will pass therein through said second mentioned entrance opening.

In testimony whereof I affix my signature.

JOSEPH W. SHUMATE.